US012620506B1

(12) United States Patent
Bigbee, Jr. et al.

(10) Patent No.: US 12,620,506 B1
(45) **Date of Patent: *May 5, 2026**

(54) SYSTEM, COMPOSITION AND METHOD OF APPLICATION OF SAME FOR REDUCING THE COEFFICIENT OF FRICTION AND REQUIRED PULLING FORCE DURING INSTALLATION OF WIRE OR CABLE

(71) Applicant: Encore Wire Corporation, McKinney, TX (US)

(72) Inventors: William T. Bigbee, Jr., Hawkins, TX (US); Sheri H. Dahlke, West Lakeland, MN (US); Ronald A. Raedeke, Marine on St. Croix, MN (US); Jason Drew Gillen, Anna, TX (US); Melvin Glenn Debord, Van Alstyne, TX (US)

(73) Assignee: Encore Wire Corporation, McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/031,547

(22) Filed: Jan. 18, 2025

Related U.S. Application Data

(63) Continuation of application No. 18/670,350, filed on May 21, 2024, now Pat. No. 12,300,404, which is a (Continued)

(51) Int. Cl.
*H01B 7/02* (2006.01)
*C10M 145/28* (2006.01)
(Continued)

(52) U.S. Cl.
CPC ............ *H01B 7/02* (2013.01); *C10M 145/28* (2013.01); *C10M 155/02* (2013.01);
(Continued)

(58) Field of Classification Search
CPC .......... H01B 7/02; H01B 1/023; H01B 1/026; H01B 3/00; H01B 7/00; C10M 145/28;
(Continued)

(56) References Cited

U.S. PATENT DOCUMENTS 2,276,437 A 3/1942 Vaala
2,685,707 A 8/1954 Llewellyn et al.
(Continued)

FOREIGN PATENT DOCUMENTS

CA 2726607 A1 12/2009
CN 202917210 U 5/2013
(Continued)

OTHER PUBLICATIONS

American Polywater Corporation, "Laboratory Report—American Polywater Spurt Spray Lubricant Test Compared to Polywater J and NN", Aug. 9, 2005, 6 pages.
(Continued)

*Primary Examiner* — Taiwo Oladapo
(74) *Attorney, Agent, or Firm* — Warren Rhoades LLP

(57) ABSTRACT

A composition and method for reducing the coefficient of friction and required pulling force of a wire or cable are provided. A composition of aqueous emulsion is provided that is environmentally friendly, halogen free and solvent free. The composition is compatible with various types of insulating materials and may be applied after the wire or cable is cooled and also by spraying or submerging the wire or cable in a bath. The composition contains lubricating agents that provide lower coefficient of friction for wire or cable installation and continuous wire or cable surface lubrication thereafter.

18 Claims, 3 Drawing Sheets

Related U.S. Application Data continuation of application No. 17/900,202, filed on Aug. 31, 2022, now abandoned, which is a continuation of application No. 17/380,605, filed on Jul. 20, 2021, now Pat. No. 11,456,088, which is a continuation of application No. 16/780,807, filed on Feb. 3, 2020, now Pat. No. 11,101,053, which is a continuation of application No. 16/364,122, filed on Mar. 25, 2019, now Pat. No. 10,580,551, which is a continuation of application No. 16/057,613, filed on Aug. 7, 2018, now Pat. No. 10,276,279, which is a continuation of application No. 15/251,975, filed on Aug. 30, 2016, now Pat. No. 10,062,475, which is a continuation of application No. 14/927,277, filed on Oct. 29, 2015, now Pat. No. 9,458,404, which is a continuation of application No. 14/150,246, filed on Jan. 8, 2014, now Pat. No. 9,200,234, which is a continuation of application No. 12/909,501, filed on Oct. 21, 2010, now Pat. No. 8,658,576.

(60) Provisional application No. 61/253,728, filed on Oct. 21, 2009.

(51) Int. Cl.

| | |
|---|---|
| ***C10M 155/02*** | (2006.01) |
| ***C10M 161/00*** | (2006.01) |
| ***C10M 169/04*** | (2006.01) |
| ***C10M 173/00*** | (2006.01) |
| ***C10M 173/02*** | (2006.01) |
| ***H01B 1/02*** | (2006.01) |
| *C10M 125/26* | (2006.01) |
| *C10M 145/14* | (2006.01) |
| *C10N 20/04* | (2006.01) |
| *C10N 30/06* | (2006.01) |
| *C10N 40/32* | (2006.01) |
| *C10N 50/00* | (2006.01) |
| *H01B 3/00* | (2006.01) |
| *H01B 7/00* | (2006.01) |

(52) U.S. Cl.

CPC ........ *C10M 161/00* (2013.01); *C10M 169/04* (2013.01); *C10M 169/044* (2013.01); *C10M 173/00* (2013.01); *C10M 173/02* (2013.01); *H01B 1/023* (2013.01); *H01B 1/026* (2013.01); *C10M 125/26* (2013.01); *C10M 145/14* (2013.01); *C10M 2201/02* (2013.01); *C10M 2201/10* (2013.01); *C10M 2205/022* (2013.01); *C10M 2205/16* (2013.01); *C10M 2207/10* (2013.01); *C10M 2207/40* (2013.01); *C10M 2209/084* (2013.01); *C10M 2209/104* (2013.01); *C10M 2213/02* (2013.01); *C10M 2213/062* (2013.01); *C10M 2217/024* (2013.01); *C10M 2229/02* (2013.01); *C10M 2229/04* (2013.01); *C10M 2229/041* (2013.01); *C10M 2290/00* (2013.01); *C10N 2020/04* (2013.01); *C10N 2030/06* (2013.01); *C10N 2040/32* (2013.01); *C10N 2050/01* (2020.05); *C10N 2050/011* (2020.05); *H01B 3/00* (2013.01); *H01B 7/00* (2013.01)

(58) Field of Classification Search

CPC .............. C10M 155/02; C10M 161/00; C10M 169/04; C10M 169/044; C10M 173/00; C10M 173/02; C10M 125/26; C10M 145/14; C10M 2201/02; C10M 2201/10; C10M 2205/022; C10M 2205/16; C10M 2207/10; C10M 2207/40; C10M 2209/084; C10M 2209/104; C10M 2213/02; C10M 2213/062; C10M 2217/024; C10M 2229/02; C10M 2229/04; C10M 2229/041; C10M 2290/00; C10N 2020/04; C10N 2030/06; C10N 2040/32; C10N 2050/01; C10N 2050/011

See application file for complete search history.

(56) References Cited

U.S. PATENT DOCUMENTS

| | | | |
|---|---|---|---|
| 2,930,838 | A | 3/1960 | Chizallet et al. |
| 3,064,073 | A | 11/1962 | Downing et al. |
| 3,108,981 | A | 10/1963 | Clark et al. |
| 3,191,005 | A | 6/1965 | Cox, II |
| 3,258,031 | A | 6/1966 | French |
| 3,333,037 | A | 7/1967 | Humphrey et al. |
| 3,378,628 | A | 4/1968 | Garner |
| 3,433,884 | A | 3/1969 | Cogelia et al. |
| 3,668,175 | A | 6/1972 | Sattler |
| 3,747,428 | A | 7/1973 | Waner et al. |
| 3,775,175 | A | 11/1973 | Merian |
| 3,822,875 | A | 7/1974 | Schmedemann |
| 3,849,221 | A | 11/1974 | Middleton |
| 3,852,875 | A | 12/1974 | McAmis et al. |
| 3,868,436 | A | 2/1975 | Ootsuji et al. |
| 3,877,142 | A | 4/1975 | Hamano et al. |
| 3,885,286 | A | 5/1975 | Hil |
| 3,936,572 | A | 2/1976 | MacKenzie, Jr. et al. |
| 3,980,808 | A | 9/1976 | Kikuchi et al. |
| 4,002,797 | A | 1/1977 | Hacker et al. |
| 4,043,851 | A | 8/1977 | Holladay et al. |
| 4,057,956 | A | 11/1977 | Tolle |
| 4,099,425 | A | 7/1978 | Moore |
| 4,100,245 | A | 7/1978 | Horikawa et al. |
| 4,137,623 | A | 2/1979 | Taylor |
| 4,273,806 | A | 6/1981 | Stechler |
| 4,273,829 | A | 6/1981 | Perreault |
| 4,274,509 | A | 6/1981 | Thomson et al. |
| 4,275,096 | A | 6/1981 | Taylor |
| 4,299,256 | A | 11/1981 | Bacehowski et al. |
| 4,356,139 | A | 10/1982 | Rowland et al. |
| 4,360,492 | A | 11/1982 | Rowland et al. |
| 4,414,917 | A | 11/1983 | Bentley et al. |
| 4,416,380 | A | 11/1983 | Flum |
| 4,447,569 | A | 5/1984 | Brecker et al. |
| 4,449,290 | A | 5/1984 | Saunders et al. |
| 4,454,949 | A | 6/1984 | Flum |
| 4,461,712 | A | 7/1984 | Jonnes |
| 4,475,629 | A | 10/1984 | Jonnes |
| 4,522,733 | A | 6/1985 | Jonnes |
| 4,537,929 | A | 8/1985 | Nangrani |
| 4,547,246 | A | 10/1985 | Viriyayuthakorn et al. |
| 4,565,725 | A | 1/1986 | Spamer et al. |
| 4,568,420 | A | 2/1986 | Nonni |
| 4,569,420 | A | 2/1986 | Pickett et al. |
| 4,605,818 | A | 8/1986 | Arroyo et al. |
| 4,650,073 | A | 3/1987 | Young |
| 4,673,516 | A | 6/1987 | Berry |
| 4,684,214 | A | 8/1987 | Goldmann et al. |
| 4,693,936 | A | 9/1987 | McGregor et al. |
| 4,749,059 | A | 6/1988 | Jonnes et al. |
| 4,751,261 | A | 6/1988 | Miyata et al. |
| 4,761,445 | A | 8/1988 | Chiba |
| 4,773,954 | A | 9/1988 | Starnes, Jr. |
| 4,781,847 | A | 11/1988 | Weitz |
| 4,806,425 | A | 2/1989 | Chu-Ba |
| 4,868,054 | A | 9/1989 | Kartheiser |
| 4,902,749 | A | 2/1990 | Akkapeddi et al. |
| 4,937,142 | A | 6/1990 | Ogushi et al. |
| 4,940,504 | A | 7/1990 | Starnes, Jr. |
| 4,952,021 | A | 8/1990 | Aoki et al. |
| 4,965,249 | A | 10/1990 | De With et al. |
| 5,036,121 | A | 7/1991 | Coaker et al. |
| 5,055,522 | A | 10/1991 | Ikeda et al. |
| 5,063,272 | A | 11/1991 | Sasse |

(56) References Cited

U.S. PATENT DOCUMENTS

| | | | |
|---|---|---|---|
| 5,074,640 | A | 12/1991 | Hardin et al. |
| 5,106,701 | A | 4/1992 | Kurosaka et al. |
| 5,130,184 | A | 7/1992 | Ellis |
| 5,156,715 | A | 10/1992 | Starnes, Jr. |
| 5,182,784 | A | 1/1993 | Hager et al. |
| 5,190,679 | A | 3/1993 | McDonald |
| 5,213,644 | A | 5/1993 | Phillips et al. |
| 5,217,795 | A | 6/1993 | Sasse et al. |
| 5,225,635 | A | 7/1993 | Wake et al. |
| 5,227,080 | A | 7/1993 | Berry |
| 5,252,676 | A | 10/1993 | Suyama et al. |
| 5,324,588 | A | 6/1994 | Rinehart et al. |
| 5,326,638 | A | 7/1994 | Mottine, Jr. et al. |
| 5,346,383 | A | 9/1994 | Starnes, Jr. |
| 5,356,710 | A | 10/1994 | Rinehart |
| 5,383,799 | A | 1/1995 | Fladung |
| 5,416,269 | A | 5/1995 | Kemp et al. |
| 5,451,718 | A | 9/1995 | Dixon |
| 5,460,885 | A | 10/1995 | Chu-Ba |
| 5,462,601 | A | 10/1995 | Falcoff et al. |
| 5,492,760 | A | 2/1996 | Sarma et al. |
| 5,505,900 | A | 4/1996 | Suwanda et al. |
| 5,519,172 | A | 5/1996 | Spencer et al. |
| 5,561,730 | A | 10/1996 | Lochkovic et al. |
| 5,565,242 | A | 10/1996 | Buttrick, Jr. et al. |
| 5,614,288 | A | 3/1997 | Bustos |
| 5,614,482 | A | 3/1997 | Baker et al. |
| 5,654,095 | A | 8/1997 | Yin et al. |
| 5,656,371 | A | 8/1997 | Kawahigashi et al. |
| 5,660,932 | A | 8/1997 | Durston |
| 5,707,468 | A | 1/1998 | Arnold et al. |
| 5,707,770 | A | 1/1998 | Tanikawa et al. |
| 5,708,084 | A | 1/1998 | Hauenstein et al. |
| 5,733,823 | A | 3/1998 | Sugioka et al. |
| 5,735,528 | A | 4/1998 | Olsson |
| 5,741,858 | A | 4/1998 | Brann et al. |
| 5,753,861 | A | 5/1998 | Hansen et al. |
| 5,759,926 | A | 6/1998 | Pike et al. |
| 5,795,652 | A | 8/1998 | Bell et al. |
| 5,846,355 | A | 12/1998 | Spencer et al. |
| 5,852,116 | A | 12/1998 | Cree et al. |
| 5,856,405 | A | 1/1999 | Hofmann |
| 5,886,072 | A | 3/1999 | Linsky et al. |
| 5,912,436 | A | 6/1999 | Sanchez et al. |
| 5,925,601 | A | 7/1999 | McSherry et al. |
| 5,965,263 | A | 10/1999 | Tatematsu et al. |
| 5,981,008 | A | 11/1999 | Hofmann |
| 6,039,024 | A | 3/2000 | Carlson et al. |
| 6,054,224 | A | 4/2000 | Nagai et al. |
| 6,057,018 | A | 5/2000 | Schmidt |
| 6,060,162 | A | 5/2000 | Mn et al. |
| 6,060,638 | A | 5/2000 | Paul et al. |
| 6,063,496 | A | 5/2000 | Jozokos et al. |
| 6,064,073 | A | 5/2000 | Hoogenraad |
| 6,080,489 | A | 6/2000 | Mehta |
| 6,101,804 | A | 8/2000 | Gentry et al. |
| 6,106,741 | A | 8/2000 | Heimann et al. |
| 6,114,036 | A | 9/2000 | Rinehart et al. |
| 6,114,632 | A | 9/2000 | Planas, Sr. et al. |
| 6,137,058 | A | 10/2000 | Moe et al. |
| 6,146,699 | A | 11/2000 | Bonicel et al. |
| 6,157,874 | A | 12/2000 | Cooley et al. |
| 6,159,617 | A | 12/2000 | Foster et al. |
| 6,160,940 | A | 12/2000 | Summers et al. |
| 6,184,473 | B1 | 2/2001 | Reece et al. |
| 6,188,026 | B1 * | 2/2001 | Cope .................... H01B 13/145 174/120 FP |
| 6,214,462 | B1 | 4/2001 | Andre et al. |
| 6,222,132 | B1 | 4/2001 | Higashiura et al. |
| 6,228,495 | B1 | 5/2001 | Lupia et al. |
| 6,242,097 | B1 | 6/2001 | Nishiguchi et al. |
| 6,270,849 | B1 | 8/2001 | Popoola et al. |
| 6,281,431 | B1 | 8/2001 | Cumley |
| 6,319,604 | B1 | 11/2001 | Xu |
| 6,327,841 | B1 | 12/2001 | Bertini et al. |
| 6,329,055 | B1 | 12/2001 | Higashiura et al. |
| 6,347,561 | B2 | 2/2002 | Uneme et al. |
| 6,359,231 | B2 | 3/2002 | Reece et al. |
| 6,395,989 | B2 | 5/2002 | Lecoeuvre et al. |
| 6,416,813 | B1 | 7/2002 | Valls Prats |
| 6,418,704 | B2 | 7/2002 | Bertini et al. |
| 6,424,768 | B1 | 7/2002 | Booth et al. |
| 6,430,913 | B1 | 8/2002 | Gentry et al. |
| 6,437,249 | B1 | 8/2002 | Higashiura et al. |
| 6,461,730 | B1 | 10/2002 | Bachmann et al. |
| 6,474,057 | B2 | 11/2002 | Bertini et al. |
| 6,495,756 | B1 | 12/2002 | Burke et al. |
| 6,530,205 | B1 | 3/2003 | Gentry et al. |
| 6,534,717 | B2 | 3/2003 | Suzuki et al. |
| 6,565,242 | B2 | 5/2003 | Dai |
| 6,596,945 | B1 | 7/2003 | Hughey et al. |
| 6,598,645 | B1 | 7/2003 | Larson |
| 6,640,533 | B2 | 11/2003 | Bertini et al. |
| 6,646,205 | B2 | 11/2003 | Hase et al. |
| 6,728,206 | B1 | 4/2004 | Carlson |
| 6,734,361 | B2 | 5/2004 | Mesaki et al. |
| 6,766,091 | B2 | 7/2004 | Beuth et al. |
| 6,810,188 | B1 | 10/2004 | Suzuki et al. |
| 6,850,681 | B2 | 2/2005 | Lepont et al. |
| 6,903,264 | B2 | 6/2005 | Watanabe et al. |
| 6,906,258 | B2 | 6/2005 | Hirai et al. |
| 6,912,222 | B1 | 6/2005 | Wheeler et al. |
| 6,977,280 | B2 | 12/2005 | Lee et al. |
| 6,997,280 | B2 | 2/2006 | Minoura et al. |
| 6,997,999 | B2 | 2/2006 | Houston et al. |
| 6,998,536 | B2 | 2/2006 | Barusseau et al. |
| 7,053,308 | B2 | 5/2006 | Prats |
| 7,087,843 | B2 | 8/2006 | Ishii et al. |
| 7,129,415 | B1 | 10/2006 | Bates et al. |
| 7,135,524 | B2 | 11/2006 | Breitscheidel et al. |
| 7,136,556 | B2 | 11/2006 | Brown et al. |
| 7,144,952 | B1 | 12/2006 | Court et al. |
| 7,158,707 | B2 | 1/2007 | Will et al. |
| 7,208,684 | B2 | 4/2007 | Fetterolf, Sr. et al. |
| 7,247,266 | B2 | 7/2007 | Bolcar |
| 7,267,571 | B1 | 9/2007 | Twigg et al. |
| 7,302,143 | B2 | 11/2007 | Ginocchio et al. |
| 7,411,129 | B2 | 8/2008 | Kummer et al. |
| 7,485,810 | B2 | 2/2009 | Bates et al. |
| 7,490,144 | B2 | 2/2009 | Carlson et al. |
| 7,491,889 | B2 | 2/2009 | Dinkelmeyer et al. |
| 7,549,474 | B2 | 6/2009 | Valenziano et al. |
| 7,555,542 | B1 | 6/2009 | Ayers et al. |
| 7,557,301 | B2 | 7/2009 | Kummer et al. |
| 7,642,451 | B2 | 1/2010 | Bonn |
| 7,678,311 | B2 | 3/2010 | Bolcar |
| 7,749,024 | B2 | 7/2010 | Chambers et al. |
| 7,776,441 | B2 | 8/2010 | Mhetar et al. |
| 7,934,311 | B2 | 5/2011 | Varkey |
| 8,043,119 | B2 | 10/2011 | Kummer et al. |
| 8,088,997 | B2 | 1/2012 | Picard et al. |
| 8,382,518 | B2 | 2/2013 | Chambers et al. |
| 8,616,918 | B2 | 12/2013 | Chambers et al. |
| 8,658,576 | B1 | 2/2014 | Bigbee, Jr. et al. |
| 8,701,277 | B2 | 4/2014 | Kummer et al. |
| 9,431,152 | B2 | 8/2016 | Sasse et al. |
| 2002/0002221 | A1 | 1/2002 | Lee |
| 2002/0051850 | A1 | 5/2002 | Bennett et al. |
| 2002/0139559 | A1 | 10/2002 | Valls Prats |
| 2003/0013615 | A1 | 1/2003 | Levy |
| 2003/0076011 | A1 | 4/2003 | Brownfiel |
| 2003/0195279 | A1 | 10/2003 | Shah et al. |
| 2004/0001682 | A1 | 1/2004 | Beuth et al. |
| 2004/0045735 | A1 | 3/2004 | Varkey et al. |
| 2004/0254299 | A1 | 12/2004 | Lee et al. |
| 2005/0019353 | A1 | 1/2005 | Prinz et al. |
| 2005/0023029 | A1 | 2/2005 | Mammeri et al. |
| 2005/0092025 | A1 | 5/2005 | Fridrich |
| 2005/0106328 | A1 | 5/2005 | Moore et al. |
| 2005/0107493 | A1 | 5/2005 | Amizadeh-Asl |
| 2005/0180725 | A1 | 8/2005 | Carlson et al. |
| 2005/0180726 | A1 | 8/2005 | Carlson et al. |
| 2006/0021787 | A1 | 2/2006 | Fetterolf et al. |
| 2006/0065428 | A1 | 3/2006 | Kummer et al. |

(56) References Cited

U.S. PATENT DOCUMENTS

| | | | |
|---|---|---|---|
| 2006/0065430 | A1 | 3/2006 | Kummer et al. |
| 2006/0068085 | A1 | 3/2006 | Reece et al. |
| 2006/0068086 | A1 | 3/2006 | Reece et al. |
| 2006/0088657 | A1 | 4/2006 | Reece et al. |
| 2006/0151196 | A1 | 7/2006 | Kummer et al. |
| 2006/0157303 | A1 | 7/2006 | Reece et al. |
| 2006/0167158 | A1 | 7/2006 | Yagi et al. |
| 2006/0191621 | A1 | 8/2006 | Kummer et al. |
| 2006/0249298 | A1 | 11/2006 | Reece et al. |
| 2006/0249299 | A1 | 11/2006 | Kummer et al. |
| 2006/0251802 | A1 | 11/2006 | Kummer et al. |
| 2007/0066496 | A1 | 3/2007 | Morrison et al. |
| 2007/0098340 | A1 | 5/2007 | Lee et al. |
| 2007/0207186 | A1 | 9/2007 | Scanlon et al. |
| 2008/0015122 | A1 | 1/2008 | Student et al. |
| 2008/0066946 | A1 | 3/2008 | Kummer et al. |
| 2008/0203611 | A1 | 8/2008 | Henderson |
| 2008/0244925 | A1 | 10/2008 | Shin |
| 2008/0268218 | A1 | 10/2008 | Lee |
| 2009/0250238 | A1 | 10/2009 | Picard et al. |
| 2009/0250239 | A1 | 10/2009 | Picard et al. |
| 2010/0044071 | A1 | 2/2010 | Murao et al. |
| 2010/0105583 | A1 | 4/2010 | Garmier |
| 2010/0163273 | A1 | 7/2010 | Smedberg |
| 2010/0230134 | A1 | 9/2010 | Chambers et al. |
| 2010/0236811 | A1 | 9/2010 | Sasse et al. |
| 2010/0255186 | A1 | 10/2010 | Montes et al. |
| 2010/0285968 | A1 | 11/2010 | Gregory |
| 2011/0034357 | A1 | 2/2011 | Kawata et al. |
| 2011/0132633 | A1 | 6/2011 | Montena |
| 2011/0144244 | A1 | 6/2011 | Lee |
| 2011/0290528 | A1 | 12/2011 | Honda et al. |
| 2011/0306721 | A1 | 12/2011 | Mehta et al. |
| 2012/0012362 | A1 | 1/2012 | Kim et al. |
| 2013/0168126 | A1 | 7/2013 | Kuchta et al. |
| 2013/0168128 | A1 | 7/2013 | Lopez-Gonzalez |
| 2015/0027365 | A1 | 1/2015 | Shutic et al. |

FOREIGN PATENT DOCUMENTS

| | | | |
|---|---|---|---|
| CN | 105837997 | A | 8/2016 |
| EP | 0283132 | A2 | 9/1988 |
| EP | 0364717 | A1 | 4/1990 |
| EP | 0544411 | A1 | 6/1993 |
| EP | 1524294 | A1 | 4/2005 |
| FR | 2674364 | A1 | 9/1992 |
| IN | 9500996 14 | | 3/2010 |
| JP | 61133506 | A | 6/1986 |
| JP | 61133507 | | 6/1986 |
| JP | 01110013 | | 4/1989 |
| JP | 01144504 | | 6/1989 |
| JP | 01166410 | A | 6/1989 |
| JP | 01307110 | | 12/1989 |
| JP | 05266720 | | 10/1993 |
| JP | 06057145 | | 3/1994 |
| JP | 6-128580 | A | 5/1994 |
| JP | 9045143 | A | 2/1997 |
| JP | 09251811 | | 9/1997 |
| JP | 1012051 | | 1/1998 |
| JP | 1086207 | A | 4/1998 |
| JP | 2001264601 | A | 9/2001 |
| JP | 2002231065 | | 8/2002 |
| JP | 2003323820 | | 11/2003 |
| WO | 198900763 | A1 | 1/1989 |
| WO | 1991008262 | A2 | 6/1991 |
| WO | 1995012885 | A1 | 5/1995 |
| WO | 2000040653 | A1 | 7/2000 |
| WO | 2001081969 | A1 | 11/2001 |
| WO | 2001090230 | A1 | 11/2001 |
| WO | 2002043391 | A1 | 5/2002 |
| WO | 2003086731 | A1 | 10/2003 |
| WO | 2005042226 | A1 | 5/2005 |
| WO | 2006015345 | A2 | 2/2006 |
| WO | 2006016895 | A1 | 2/2006 |
| WO | 2006016896 | A1 | 2/2006 |
| WO | 2006118702 | A2 | 11/2006 |
| WO | 2006127711 | A2 | 11/2006 |
| WO | 2007081372 | A1 | 7/2007 |
| WO | 2007084745 | A2 | 7/2007 |
| WO | 2009126613 | A1 | 10/2009 |
| WO | 2009126619 | A1 | 10/2009 |
| WO | 2010107932 | A1 | 9/2010 |
| WO | 2010113004 | A2 | 10/2010 |

OTHER PUBLICATIONS

American Polywater Corporation, "Polywater J Specification", Aug. 2010, 4 pages.
American Polywater Corporation, "Polywater SPY Cable Lubricant—Technical Specification", May 2008, 4 pages.
American Polywater Corporation, "Polywater SPY Lubricant—Technical Report", Feb. 26, 2008, 4 pages.
Axel Plastics Research Laboratories, Inc., Product Data Sheet re "Mold Wiz. INT-40DHT" (Approx. 2001) (1 p).
CSA Standards Update Service, "Thermoplastic-Insulated Wires and Cables", UL 83, Thirteenth Edition, Nov. 15, 2003, 186 pages.
Decoste, "Friction of Vinyl Chloride Plastics", SPE Journal, vol. 25, Oct. 1969, pp. 67-71.
Domininghaus, "Les Matieres plastiques les plus usuelles," Informations Chimie No. 158, pp. 179-194, 1976.
Dow Corning article "Siloxane additive minimizes friction in fibre optic cable conduit", 2000 (2 pp) (http://www.dowcorning.com).
Dow Corning Material Safety Data Sheet re Dow Corning MB50-011 composition, Mar. 4, 2008 (1 p) (http://www.dowcorning.com).
Dow Corning Material Safety Data Sheet sheet re Dow Corning MB50-320 composition, Mar. 4, 2008 (I pp) (http://www.dowcorning.com).
Dow Corning Material Safety Data Sheet: re Dow Corning MB50-008 composition, Mar. 4, 2008 (1 pp) (http://www.dowcorning.com).
Dow Corning Product Information sheet re Dow Corning MB40-006 composition. 1997-2005(1 p) (http://www.downcorning.com).
Dow Corning Product Information sheet re Dow Corning MB50-001 composition. Jan. 15, 2001 (6 pp) (http://www.dowcorning.com).
Dow Corning Product Information sheet re Dow Corning MB50-002 composition, 1997-2014 (4 pp) (http://www.dowcorning.com).
Dow Corning Product Information sheet re Dow Corning MB50-004 composition, Jan. 15, 2001 (4 pp) (http://www.dowcorning.com).
Dow Corning Product Information sheet re Dow Corning MB50-010 composition, Jan. 16, 2001 (2pp) (http://www.dowcorning.com).
Dow Corning Product Information sheet re Dow Corning MB50-321 composition, Jan. 15, 2001 (2pp) (http://www.dowcorning.com).
Dow Corning Product information sheets re Dow Corning MB50-313 composition, Nov. 5, 2001 (4 pp) (http://www.dowcorning.com).
Dow Corning Product information sheets re Dow Corning MB50-314 composition, Nov. 5, 2001 (4 pp) (http://www.dowcorning.com).
Dow Corning, "Dow Corning MB50-011 Masterbatch Material Safety Data Sheet Information", 1997-2001.
Dow Corning, "Dow Corning MB50-011 Masterbatch Product Information", Ultra-high Molecular Weight Siloxane Polymer Dispersed in Polymide 6, 1999, pp. 1-3.
European Patent Office, "Extended Search Report for Application No. 06739714.1", dated Nov. 12, 2009.
European Patent Office, Opposition to European Patent EP 1899988 and accompanying documentation, filed Oct. 22, 2013 (23 pages).
General Electric Company, Brochure entitled "GE Silicones-Fluids, Emulsions & Specialties", (2001) (19 pp).
Ideal Industries GmbH, "Yellow 77" Document, 2003, 1 page.
Trotignon et al., "Extrusion des Thermoplastiques", in "Matieres Plastiques", Editions Nathan, 1996, p. 148.
Underwriters Laboratories, Inc., Safety for Nonmetallic-Sheathed Cables, UL 719, 12th Edition, Feb. 9, 2006, pp. 1-42.

(56) References Cited

OTHER PUBLICATIONS

Wild, Frank, “The Effects of Silicone Polymer Additions on the Processing and Properties of an Isotactic Propylene Homopolymer”, Sep. 1995, 102 pages.
Wiles, John, “Clarifying Confusing Cables”, Home Power #66, Aug./Sep. 1998.

* cited by examiner

SYSTEM, COMPOSITION AND METHOD OF APPLICATION OF SAME FOR REDUCING THE COEFFICIENT OF FRICTION AND REQUIRED PULLING FORCE DURING INSTALLATION OF WIRE OR CABLE

CROSS-REFERENCE TO RELATED APPLICATIONS

This application is a continuation of U.S. patent application Ser. No. 18/670,350, filed May 21, 2024, now issued as U.S. Pat. No. 12,300,404, issued May 13, 2025, which is a continuation of U.S. patent application Ser. No. 17/900,202, filed Aug. 31, 2022; now abandoned, which is a continuation of U.S. patent application Ser. No. 17/380,605, filed Jul. 20, 2021, now issued as U.S. Pat. No. 11,456,088, issued Sep. 27, 2022, which is a continuation of U.S. patent application Ser. No. 16/780,807, filed Feb. 3, 2020, now issued as U.S. Pat. No. 11,101,053, issued Aug. 24, 2021, which is a continuation of U.S. patent application Ser. No. 16/364,122, filed Mar. 25, 2019, now issued as U.S. Pat. No. 10,580,551, issued Mar. 3, 2020, which is a continuation of U.S. patent application Ser. No. 16/057,613, filed Aug. 7, 2018, now issued as U.S. Pat. No. 10,276,279, issued Apr. 30, 2019, which is a continuation of U.S. patent application Ser. No. 15/251,975, filed Aug. 30, 2016, now Issued as U.S. Pat. No. 10,062,475, issued Aug. 28, 2018, which is a continuation of Ser. No. 14/927,277, filed Oct. 29, 2015, now issued as U.S. Pat. No. 9,458,404, issued on Oct. 4, 2016, which claims benefit of U.S. patent application Ser. No. 14/150,246, filed Jan. 8, 2014, now issued as U.S. Pat. No. 9,200,234 on Dec. 1, 2015, which claims benefit of U.S. patent application Ser. No. 12/909,501, filed on Oct. 21, 2010, now issued as U.S. Pat. No. 8,658,576 on Feb. 25, 2014, which claims priority to and benefit of U.S. Provisional Application Ser. No. 61/253,728, filed on Oct. 21, 2009, all of which are hereby incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF INVENTION

1. Field of Invention

This invention relates to wire and cable. More specifically, it relates to a systems, composition and method for applying the composition to wire and cable for all applications requiring a reduction in coefficient of friction and pulling force required for installation.

2. Description of Related Art

A wire or cable generally consists of one or more internal conductors and an insulator that envelopes internal conductors. The insulator may be made of insulating materials such as polyvinyl chloride (PVC) or polyethylene (PE). During installation of these wires or cables, increased effort is required to pull the wires or cables through the conduit due to friction between the materials involved. This friction also may result in damage of the wire or cable during the installation process.

Currently, various methods are used to minimize the coefficient of friction on the surface of the wire or cable to reduce the amount of pulling force required. One method involves incorporating lubricating agents into the insulating material during the manufacturing process of the wire or cable, specifically, prior to cooling of the insulating material. However, this method often requires lubricating agents to be impregnated or infused into the insulating material at a high temperature, which adversely affects the chemical, physical, and electrical properties of the wire or cable. Another method involves hand application of lubricating agents by hand prior to installation of the wire or cable at a job site. But this method is time consuming, labor intensive, and requires additional material to be on the job site during cable installation.

Therefore, a need exists for a composition and method for reducing coefficient of friction in a wire or cable that does not require mixing, impregnation, or infusion into the insulating material and has minimal impact on the chemical properties of the surface material.

BRIEF SUMMARY OF THE INVENTION

A composition and method for reducing the coefficient of friction and required pulling force of a wire or cable are provided. A composition of aqueous emulsion is provided that is environmentally friendly, halogen free and solvent free. The composition is compatible with various types of insulating materials and may be applied after the wire or cable is cooled and also by spraying or submerging the wire or cable in a bath. The composition comprises lubricating agents that provide lower coefficient of friction for wire or cable installation and continuous wire or cable surface lubrication thereafter. A process for making a finished wire and cable having a reduced coefficient of friction and pulling force required during installation, the process comprising providing a payoff reel containing at least one internal conductor wire; supplying the internal conductor wire from the reel to an extruder; providing at least one extruder, wherein the least one extruders applies an insulating material over the internal conductor wire; providing a cooling device for lowering the temperature of the extruded insulating material and cooling the extruded insulating material in the cooling device; providing a lubrication application device; applying a lubricating composition onto the cooled insulting material with the lubrication application device, wherein the lubricating composition comprises polytetrafluoroethylene; about 93.20 weight % based on total weight, distilled (DI) water; about 1.38 weight % based on total weight, polyethylene glycol; about 1.29 weight % based on total weight, potassium neutralized vegetable fatty acid; about 1.99 weight % based on total weight, paraffin wax emulsion; about 1.88 weight % based on total weight, polydimethylsiloxane (PDMS) emulsion; about 0.01 weight % based on total weight, polyacrylamide polymer; about 0.08 weight % based on total weight, potassium salt of polyacrylic acid polymer; and about 0.16 weight % based on total weight, silicone-based antifoaming agent; and, reeling onto a storage reel the finished, cooled and lubricated, wire and cable product for storage and distribution.

BRIEF DESCRIPTION OF THE DRAWINGS

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which.

DETAILED DESCRIPTION OF THE INVENTION

The present disclosure provides a composition and method for reducing the coefficient of friction and required pulling force of a wire or cable during installation. A composition of aqueous emulsion is provided that is environmentally friendly, halogen free and solvent free. The composition is compatible with various types of insulating materials including, but not limited to, polyvinyl chloride (PVC) and polyethylene (PE).

The composition includes lubricating agents having a viscosity that allows for various application methods, for example, by way of spraying over the wire or cable or submerging the wire or cable in a bath. In one embodiment, the viscosity of the composition is between about 1 and about 1000 cps at about 25 degrees Celsius and a pH level ranging between about 6.6 to about 10. This viscosity minimizes the dripping and flowing of the composition after it is applied to the wire or cable, thereby making it easier to apply during the manufacturing process.

Figure 1:
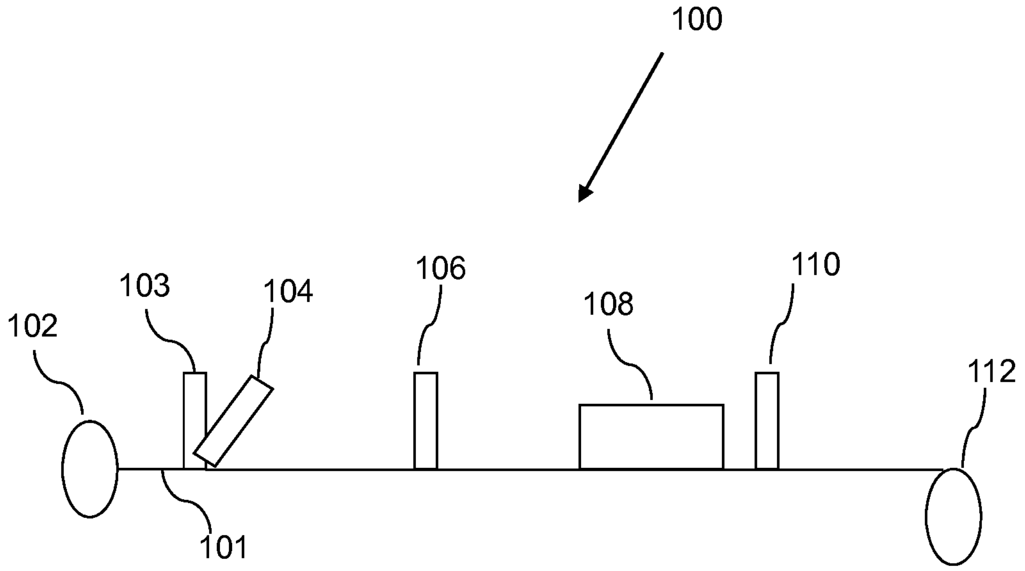
FIG. 1 is a diagram illustrating a system for application of a composition to reduce the coefficient of friction and required pulling force during installation of wire or cable in accordance with an embodiment of the present disclosure.

Referring to FIG. 1, a diagram illustrating system for applying a composition to reduce the coefficient of friction and required pulling force during installation of wire or cable is depicted in accordance with one embodiment of the present disclosure. In this embodiment, a standard payoff reel 102 to supply an internal conductor(s) 101, such as a copper or aluminum wire is provided in system 100. The standard payoff reel 102 supplies the internal conductor(s) 101 to an extruder 103 to apply an insulating material over the internal conductor(s) 101. Extruder 103 may be a single extruder head, a plurality of extruders, a cross head, a co-extrusion head or any combination thereof. The insulating material may be thermoset, thermoplastic, elastomeric, polymeric dielectric or a semiconductor compound or any combination thereof.

A first optional extruder 104 is also provided in system 100 to apply an additional layer of insulating material over the internal conductor(s) 101 that may comprise a thermoset, thermoplastic, elastomeric, polymeric dielectric or a semiconductor compound or any combination thereof. The first optional extruder 104 may also function in the system 100 to apply a further additional layer of material, such as, but not limited to Nylon, over the wire or cable to form an outer jacket.

A second optional extruder 106 may also be provided in system 100 to apply a further additional layer of thermoplastic or thermoset material thermoset, thermoplastic, elastomeric, polymeric dielectric or a semiconductor compound or any combination thereof such as, but not limited to, Nylon over the insulated wire or cable to form an outer jacket. Alternatively, second optional extruder 106 may be provided to apply additional insulating material over the insulated wire or cable to form an additional insulating layer. For example, second optional extruder 106 may be provided to apply an insulating material, such as PVC, over the insulated wire or cable. It is contemplated by the present invention that even further additional optional extruders may be provided for additional material application to the wire and cable.

After the insulating material is applied, the insulated wire or cable is supplied to a cooling device 108 for cooling the applied insulating material over the wire or cable. In one embodiment, the cooling device 108 may be a water trough or similar device that contains a cooling material. The cooling device 108 functions to cool and lower the temperature of the insulating material over the wire or cable as it departs extruder 103 and/or first optional extruder 104 and/or second optional extruder 106 and enters the cooling device 108 by removing latent heat caused by extrusion in extruder 104 or the first optional extruder 104 or the second optional extruder 106. The cooling of insulating material provides a more stable polymeric state for later processing. In one embodiment, the insulating material is cooled to an ambient temperature, such as a temperature of less than 85 degrees Celsius.

Once the insulated wire or cable is cooled, an application device 110 is provided in system 100 to apply the composition with lubricating agents over the cooled and insulated wire or cable. Because the composition with lubricating agents may be used between about −5 degrees and about 50 degrees Celsius, it may be applied after the wire or cable is cooled instead of the need for impregnating, infusing or mixing the lubricating agents with the insulating material at a high temperature prior to cooling. Therefore, the chemical, physical, or electrical properties of the wire or cable may be preserved.

In one embodiment, the application device 110 may be a spraying device for spaying the composition of lubricating agents over the surface of the cooled and insulated wire or cable. In one embodiment, the spraying device 110 may comprise a tank for storing the composition of lubricating agents, at least one spraying nozzle for spraying the composition of lubricating materials, a pump (not shown) for delivering the composition of lubricating agents from the tank to the at least one spraying nozzle (not shown), and a valve (not show) for controlling the pressure at which the composition of lubricating agents is applied over the wire or cable. The at least one spraying nozzle may be a circumferential spray head that applies an even coating of the composition of lubricating agents over the entire length of the cooled and insulated wire or cable. Because the composition with the lubricating agents has a low viscosity, it allows for flowing of the composition over the wire or cable surface without clogging the at least one spraying nozzle.

In an alternative embodiment, the application device 110 may be a trough bath filled with the composition of lubricating agents. In this embodiment, the cooled and insulated wire or cable is pulled through the trough-like bath to coat the surface of the cooled and insulated wire or cable with the composition of lubricating agents. The trough bath may comprise a tank for storing the composition of lubricating agents, a recirculating pump for recirculating the composition of lubricating agents, and a set of air knives at the terminal end of the trough bath to remove excess composition of lubricating agents before the wire or cable exits the bath. The trough bath provides a complete coverage of the lubricating agent over the wire or cable as the wire or cable is submerged in the bath when it is pulled through the trough.

After application device 110 applies the composition over the cooled and insulated wire or cable, a motor-driven reel 112 is provided to wind up the resulting wire or cable. The resulting wire or cable is reeled by the motor-driven reel 112 and wrapped in plastic film for distribution or storage.

Figure 2:
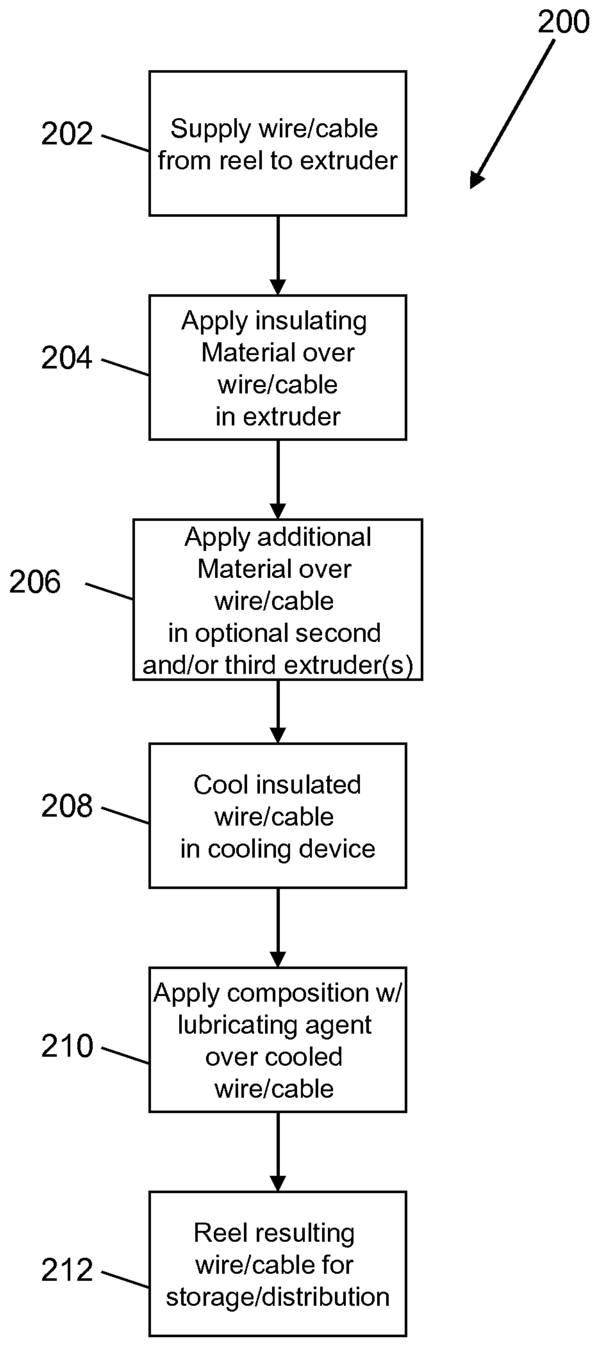
FIG. 2 is a diagram illustrating a method for reducing the coefficient of friction and required pulling force during installation of wire or cable in accordance with an embodiment of the present disclosure.

Referring to FIG. 2, a diagram illustrating a process for reducing the coefficient of friction is depicted in accordance with one embodiment of the present disclosure. Process 200 begins at step 202 to supply a conductor wire or cable from a reel to an extruder. Next, process 200 continues to step 204 to apply an insulating material over the internal conductor of the wire or cable. For example, insulating material such as PVC or PE may be applied over the internal conductor in extruder 104 of FIG. 1. Process 200 then continues to step 206 to apply additional material over the insulated wire or cable in an optional extruder. For example, additional insulating material, such as PVC or PE, may be applied over the insulated wire or cable in the first optional extruder 104 and/or the second optional 106 of FIG. 1, or any combination thereof.

Process 200 then continues to step 208 to cool the insulated wire or cable using a cooling device 108 of FIG. 1. For example, the cooling device 108 may be a water trough that cools the insulating material by removing latent heat caused by extrusion in extruder 104 or optional extruder 106. In one embodiment, the insulating material is cooled to an ambient temperature, such as a temperature of less than 85 degrees Celsius. Process 200 continues to step 210 to apply a lubricating composition with lubricating agents over the cooled wire or cable. For example, a device 110, such as a spraying device or a trough-like bath, may be used to apply a lubricating composition with lubricating agents over the cooled wire or cable. Process 200 then completes at step 212 to reel the resulting wire or cable onto a storage reel for storage or distribution. For example, a motor-driven reel may be used to reel the resulting wire or cable onto spools for storage or distribution.

It is noted that the manner in which the lubricating composition is applied by application device 110 in step 210 enables the application of the lubricating composition to be performed under various wire or cable supply speed and sizes. Even if the wire or cable is supplied at a high speed, device 110 performs application of the lubricating composition and provides complete coverage of lubricating agents over the wire or cable when the wire or cable is sprayed or submerged in the bath and pulled through the trough. In addition, the application of the lubricating composition may be performed on any size wire or cable by application device 110 in step 210. Because application device 110 applies the lubricating composition over the surface of the wire or cable instead of by impregnation, infusion or mixing, no impact is made to the chemical, physical, or electrical properties of the wire or cable.

In one embodiment of the present disclosure, the lubricating composition is an environmentally friendly, solvent-free, halogen-free, water based colloidal emulsion. The viscosity of the lubricating composition enables various types of application, including spraying and coating by a bath and reduces flowing and dripping of the composition after it is applied on the wire or cable. As a result, damage to the machine or equipment is minimized during the manufacturing process.

In one embodiment of the present disclosure, the lubricating composition comprises a number of materials including, but not limited to, polytetrafluoroethylene, distilled (DI) water, polyethylene glycol (PEG), an optional potassium neutralized vegetable fatty acid, an optional paraffin wax emulsion, polydimethylsiloxane (PDMS) emulsion, an optional polyacrylamide polymer, a potassium salt of polyacrylic acid polymer, and a silicone-based antifoaming agent.

In this lubricating composition, the lubricating agents include PEG, an optional potassium neutralized vegetable fatty acid, an optional paraffin wax emulsion, and PDMS emulsion. The PEG and PDMS emulsion provides a reduction of coefficient of friction of the surface insulating material such as polythethylene (PE) and PVC. In particular, PEG is most effective with a molecular weight of about 50 to 800 and the PDMS is most effective with a viscosity of between about 1000 CST and about 20000 CST.

The optional polyacrylamide polymer and the optional potassium salt of polyacrylic acid polymer are used for rheology modification and emulsion stabilization. The silicone-based antifoaming agent are used as a processing aid. The optional polyacrylamide polymer provides the composition the ability to stay on the surface of the wire or cable without causing damages to the machine or equipment during the manufacturing process because of clogging. This component is a fluocculant that increases the wetting character and may bring lubricating agents to the surface. The potassium salt of polyacrylic acid polymer provides viscosity and coating thickness and stabilizes the emulsion of lubricating agents.

The optional potassium neutralized vegetable fatty acid provides a lower coefficient of friction in insulating materials, such as PVC, rubberized plastics, steel and wood. This component also provides wetting character to the lubricating composition. The optional paraffin wax emulsion provides a lower coefficient of friction on outer jacket material, such as Nylon.

In one embodiment of the present disclosure, the lubricating composition is composed of 85 percent or above distilled (DI) water, with about five percent or less of polyethylene glycol (PEG), potassium neutralized vegetable fatty acid, paraffin wax emulsion, c and polydimethylsiloxane (PDMS) emulsion; and about 0.25 or less percent of polyacrylamide polymer, a potassium salt of polyacrylic acid polymer, and a silicone-based antifoaming agent.

For example, the lubricating composition may comprise polytetrafluoroethylene; about 85 to 95 percent DI water; about 0.5 to about 5 percent PEG; about 0.5 to about 5 percent potassium neutralized vegetable fatty acid; about 0.5 to about 5 percent paraffin wax emulsion; about 0.5 to about 5 percent polydimethylsiloxane (PDMS) emulsion; about 0.01 to about 0.10 percent of polyacrylamide polymer, about 0.08 to about 0.25 percent of potassium salt of polyacrylic acid polymer; and about 0.01 to about 0.25 percent of silicone-based antifoaming agent.

In another example, the lubricating composition may comprise polytetrafluorocthylene; about 93.20 percent DI water, about 1.38 percent polyethylene glycol, about 1.29 percent potassium neutralized vegetable fatty acid, about 1.99 percent paraffin wax emulsion, about 1.88 percent polydimethylsiloxane (PDMS) emulsion, about 0.01 percent polyacrylamide polymer, about 0.08 percent potassium salt of polyacrylic acid polymer, and about 0.16 percent silicone-based antifoaming agent.

The combination of these materials in the lubricating composition provides a reduction in the coefficient of friction of the wire or cable surface when the wire or cable is pulled through a conduit. It also provides a thin coating spread evenly over the wire or cable surface, remains available on the wire or cable surface throughout the pull, and continues to lubricate the wire or cable surface even after it is dried. Furthermore, the lubricating composition is compatible with many different types of wire or cable, which provides for many different applications.

Figure 3:
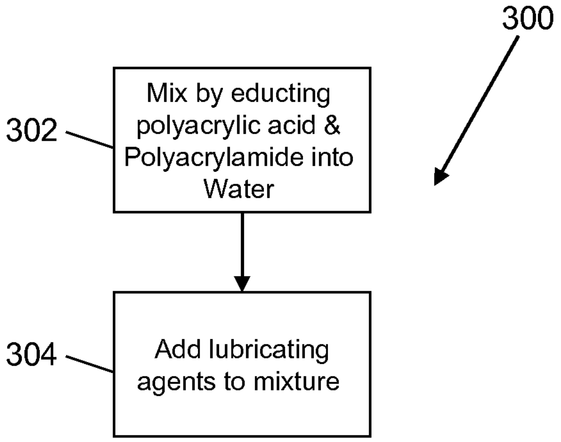
FIG. 3 is a diagram illustrating a process for forming a composition for reducing the coefficient of friction and the required pulling force during installation of wire or cable in accordance with an embodiment of the present disclosure.

Referring to FIG. 3, a diagram illustrating a process for forming a lubricating composition for reduction of coefficient of friction of a wire or cable is depicted in accordance with one embodiment of the present disclosure. Process 300 may be performed prior to step 210 in FIG. 2 in which the composition is applied over the cooled wire or cable. In this embodiment, process 300 begins at step 302 to mix by educting the potassium salt of polyacrylic acid polymer and polyacrylamide polymer into DI water to form a mixture. Next, process 300 completes at step 304 to add lubricating agents into the mixture to form the composition. In one embodiment, the lubricating agents include PEG, an optional potassium neutralized vegetable fatty acid, an optional paraffin wax emulsion, and PDMS emulsion. The lubricating agents provides a lower coefficient of friction to the wire or cable surface when the lubricating composition is subsequently applied.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. An electrical cable, the electrical cable comprising:
at least one conductor wire;
an insulating material composition over the at least one conductor wire, wherein the insulating material is cooled after application to the conductor wire;
a lubricating composition applied to the insulating material subsequent to the cooling of the insulating material, the lubricating composition comprising:
0.5-5 weight % based on the total weight, of polydimethylsiloxane (PDMS) emulsion; and
0.01-4.50 weight % of polyacrylamide polymer.

2. The electrical cable of claim 1, wherein the polydimethylsiloxane (PDMS) emulsion has 1.5-3.0 weight % based on the total weight.

3. The electrical cable of claim 2, wherein the 1.5-3.0 weight % based on the total weight of polydimethylsiloxane (PDMS) emulsion is about 1.88 weight % based on the total weight.

4. The electrical cable of claim 1, wherein the 0.01-4.50 weight % of polyacrylamide polymer comprises 0.01-0.10 weight % based on the total weight of polyacrylamide polymer.

5. The electrical cable of claim 1 further comprising salt of polyacrylic acid polymer.

6. The electrical cable of claim 5, therein the salt of polyacrylic acid polymer comprises between 0.2-0.10 weight % based upon total weight of salt of polyacrylic acid polymer.

7. The electrical cable of claim 5, wherein the salt of polyacrylic acid polymer comprises potassium salt of polyacrylic acid polymer.

8. An electrical cable, the electrical cable comprising:
at least one conductor wire;
an insulating material composition over the at least one conductor wire, wherein the insulating material is cooled after application to the conductor wire;
a lubricating composition applied to the insulating material subsequent to the cooling of the insulating material, the lubricating composition comprising:
5 weight % or less based on the total weight, of polydimethylsiloxane (PDMS) emulsion and polyacrylamide polymer.

9. The electrical cable of claim 8, wherein the polydimethylsiloxane (PDMS) emulsion has 1.5-3.0 weight % based on the total weight.

10. The electrical cable of claim 9, wherein the 1.5-3.0 weight % based on the total weight of polydimethylsiloxane (PDMS) emulsion is about 1.88 weight % based on the total weight.

11. The electrical cable of claim 8, wherein the polydimethylsiloxane (PDMS) emulsion has a viscosity between about 1000 CST to 20000 CST.

12. The electrical cable of claim 8 further comprising salt of polyacrylic acid polymer.

13. The electrical cable of claim 12, therein the salt of polyacrylic acid polymer comprises between 0.2-0.10 weight % based upon total weight of salt of polyacrylic acid polymer.

14. The electrical cable of claim 13, wherein the polydimethylsiloxane (PDMS) emulsion has 1.5-3.0 weight % based on the total weight.

15. The electrical cable of claim 14, wherein the 1.5-3.0 weight % based on the total weight of polydimethylsiloxane (PDMS) emulsion is about 1.88 weight % based on the total weight.

16. The electrical cable of claim 14, wherein the polydimethylsiloxane (PDMS) emulsion has a viscosity between about 1000 CST to 20000 CST.

17. The electrical cable of claim 12, wherein the salt of polyacrylic acid polymer comprises potassium salt of polyacrylic acid polymer.

18. The electrical cable of claim 8, wherein the polydimethylsiloxane (PDMS) emulsion has a viscosity between about 1000 CST to 20000 CST.

* * * * *